United States Patent [19]
Chiarot et al.

[11] Patent Number: 6,061,785
[45] Date of Patent: May 9, 2000

[54] DATA PROCESSING SYSTEM HAVING AN APPARATUS FOR OUT-OF-ORDER REGISTER OPERATIONS AND METHOD THEREFOR

[75] Inventors: Kevin Arthur Chiarot, Pflugerville; A. James Van Norstrand, Jr.; David Andrew Schroter, both of Round Rock, all of Tex.

[73] Assignee: International Business Machines Corporation, Armonk, N.Y.

[21] Appl. No.: 09/024,804

[22] Filed: Feb. 17, 1998

[51] Int. Cl.⁷ .................................................... G06F 15/00
[52] U.S. Cl. ............................ 712/236; 712/23; 712/218
[58] Field of Search ............................... 712/23, 24, 218, 712/219, 217, 234, 236

[56] References Cited

U.S. PATENT DOCUMENTS

| | | | |
|---|---|---|---|
| 5,560,032 | 9/1996 | Nguyen et al. | 712/23 |
| 5,805,876 | 9/1998 | Bose et al. | 712/234 |
| 5,826,070 | 10/1998 | Olson et al. | 712/222 |
| 5,828,895 | 10/1998 | Chan et al. | 712/23 |
| 5,838,988 | 11/1998 | Panwar et al. | 712/32 |
| 5,850,542 | 12/1998 | Schroter et al. | 712/235 |
| 5,898,853 | 4/1999 | Panwar et al. | 712/216 |

*Primary Examiner*—Larry D. Donaghue
*Attorney, Agent, or Firm*—Barry S. Newberger; Winstead Sechrest & Minick P.A.; Anthony V. S. England

[57] ABSTRACT

An apparatus for condition register (CR) renaming and methods of using the same are implemented. In a central processing unit (CPU) having a pipelined architecture, logical operations on CR operands may be executed out-of-order using the CR renaming mechanism. Any instruction that updates the CR data has an associated instruction identifier (IID) stored in a register. Subsequent condition register logical (LCR) instructions that use data in the CR use the stored IID to determine when the CR data has been updated by the execution of the instruction corresponding to the stored IID. When an instruction causing a CR data value update finishes executing, the updated data is obtained by snooping the finish bus of the corresponding execution unit. In this way, these instructions can obtain CR data prior to completion of the preceding instructions. Because the updated CR data is available to the LCR next to execute before the updating instruction completes, deserialized execution of LCR instructions is thereby realized.

21 Claims, 5 Drawing Sheets

DATA PROCESSING SYSTEM HAVING AN APPARATUS FOR OUT-OF-ORDER REGISTER OPERATIONS AND METHOD THEREFOR

CROSS REFERENCE TO RELATED APPLICATIONS

The present invention is related to U.S. patent application Ser. No. 09/623/891, Data Processing System Having An Apparatus for exception tracking during out of order Operation and Method therefor; Fry et al filed Feb. 13, 1998 by reference herein.

TECHNICAL FIELD

The present invention relates in general to a data processing system and, in particular, to a data processing system performing out-of-order execution.

BACKGROUND INFORMATION

As computers have been developed to perform a greater number of instructions at greater speeds, many types of architectures have been developed to optimize this process. For example, a reduced instruction set computer (RISC) device uses fewer instructions in greater parallelism in executing those instructions to ensure that computational results will be available more quickly than the results provided by more traditional data processing systems. In addition to providing increasingly parallel execution of instructions, some data processing systems implement out-of-order instruction execution to increase processor performance. Out-of-order instruction execution increases processor performance by dynamically allowing instructions dispatched with no data dependencies to execute before previous instructions in an instruction stream that have unresolved data dependencies. In some data processing systems, instructions are renamed and instruction sequencing tables, also referred to as re-order buffers, facilitate out-of-order execution by re-ordering instruction execution at instruction completion time.

Re-order buffer devices are also used to allow speculative instruction execution. Therefore, data processing systems which support speculative instruction execution can be adapted for out-of-order execution with the addition of relatively minimal hardware. A portion of this added hardware includes logic which is used to determine a time and order that instructions should be issued. Such issue logic can be extremely complex since the dependencies and instructions in a state of a pipeline in which the instructions are being executed must be examined to determine a time at which the instruction should issue. If the issue logic is not properly designed, such issue logic can become a critical path for the data processing system and limit the frequency of instruction execution such that performance gains which could be achieved by out-of-order issue are eliminated.

The out-of-order instruction execution implemented by many prior art systems increases processor performance by dynamically allowing instructions dispatched with no data dependencies to execute before previous instructions in the instruction stream that have unresolved data dependencies. Register file renaming, renaming selected bits of architected facilities, for example registers accessible by software, and instruction sequencing tables (re-order buffers) facilitate out-of-order execution by re-ordering instruction execution at instruction completion time. For more information on such structures, refer to "An Efficient Algorithm for Exploiting Multiple Arithmetic Units," by R. M. Tomasulo, published in *IBM JOURNAL*, January 1967, pp. 25–33. It should be noted that these devices are also used to allow speculative instruction execution. Therefore, system architecture supporting speculative instruction execution can be adapted for out-of-order execution with the addition of relatively "little" hardware and few overhead expenses. Thus, register file renaming may support out-of-order execution without modification from a speculative instruction execution architecture.

However, instructions that alter or use an architected register must be executed one at a time in a processor that includes only one such register. In these instances, data dependencies can only be resolved when the updating instruction completes, and the architected register then is valid. Logical operations that use or alter the contents of the condition register (CR) are representative of such instructions. The CR contains data values reporting on processor operations such as integer execution conditions, floating-point execution conditions, as well as user-defined condition values. Thus, when there is more than one instruction that updates or uses the CR, then those instructions must be executed in order according to the software program, and can cause bottlenecks in processor operations. For example, complex "IF" statements in source code can compile into multiple condition register logical instructions. According to the prior art, these must be serialized, because they all operate on the common, architected, CR.

Thus, there is a need in the art for a renaming apparatus and method that permits each instruction that needs to update or use the CR to execute out-of-order, thereby increasing instruction execution parallelism and processor performance.

SUMMARY OF THE INVENTION

The previously mentioned needs are addressed by the present invention. Accordingly, there is provided in a first form, a data processing system that includes an input circuit for communicating a plurality of instructions. A processing unit performs logical operations on data values in response to one or more of the plurality of instructions. The processing unit is coupled to the output of one or more execution units executing instructions that modify logical operation operands. The processing unit is also coupled to a data storage device that provides instruction identifiers (IIDs) corresponding to the instructions modifying the operands.

Additionally, there is provided, in a second form, a data processing mechanism for deserialized logical condition register processing. The data processing mechanism incorporates a queue including an instruction stack having one or more registers wherein each register includes at least three fields. At least two of the fields contain instruction identifiers (IIDs) corresponding to instructions modifying condition register data values. The queue also includes logic circuitry for performing logical operations on condition register data values. The logic circuitry is coupled to a data storage device that contains IIDs and communicates them to the logic circuitry.

Finally, there is provided, in a third form, a method of deserialized logical condition register processing. The method includes the step of storing a first condition register instruction in a first portion of a data storage location in a first data storage device. If second condition register instruction modifies a condition register field corresponding to an operand of the LCR, then an associated instruction identifier (IID) is stored in a second portion of the data storage location.

These and other features and advantages will be more clearly understood from the following detailed description taken in conjunction with the accompanying drawings. It is important to note that the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 which includes 3A and 3B illustrates, in block diagram form, an out-of-order CR rename mechanism implemented in accordance with an embodiment of the present invention;

DETAILED DESCRIPTION

The present invention provides a CR renaming mechanism that supports out-of-order integer unit instruction execution in which there is more than one logical instruction that needs to update or use the CR. The present invention allows logical instructions that need to update or use the CR to execute without waiting for all previous operations which modify the CR to complete.

Operation of the present invention will subsequently be described in greater detail. Prior to that discussion, however, a description of connectivity of the elements of the present invention will be provided.

In the following description, numerous specific details are set forth, such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same referenced numeral through the several views.

Figure 1:
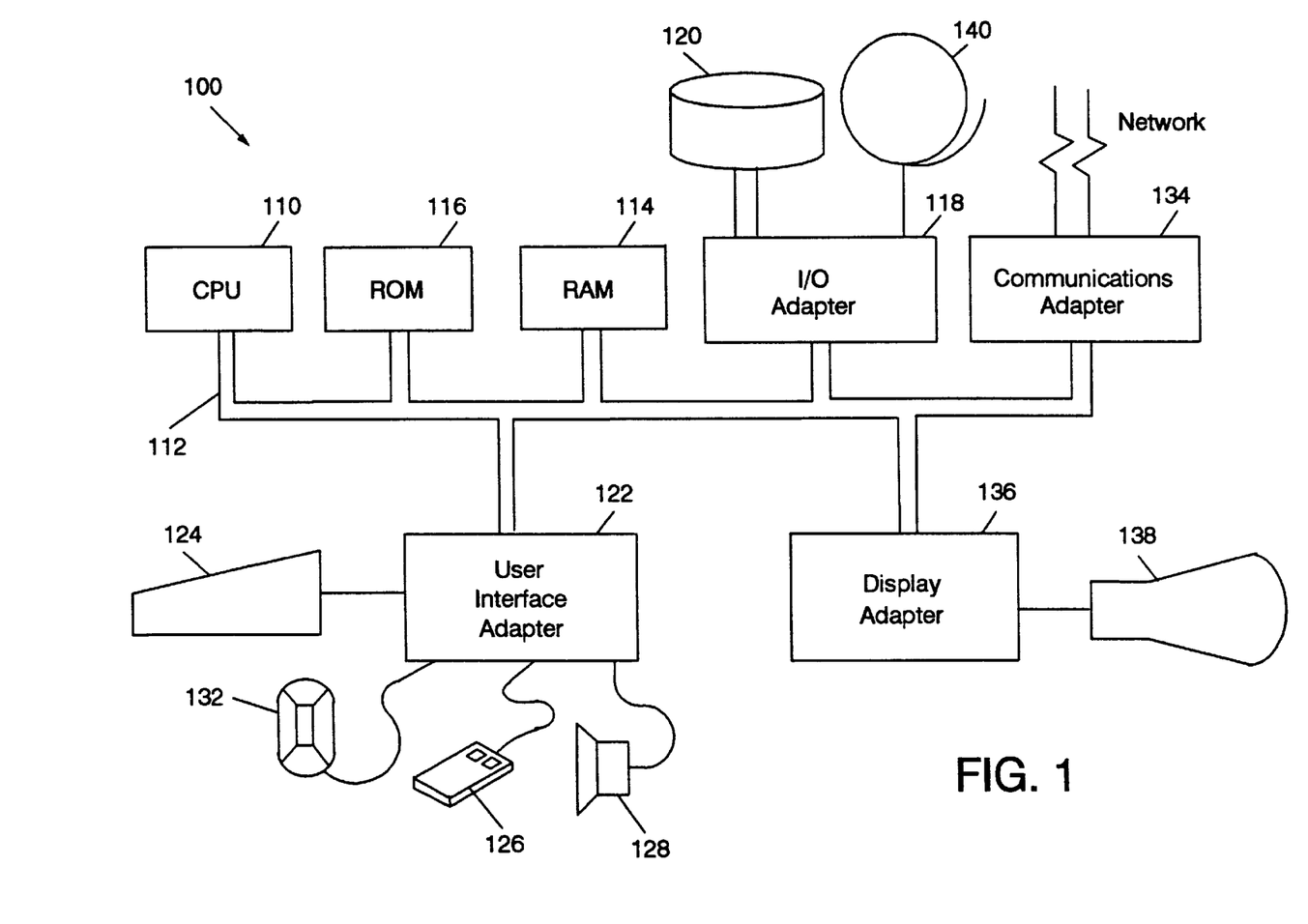
FIG. 1 illustrates, in block diagram form, a data processing system in accordance with one embodiment of the present invention.

Referring first to FIG. 1, an example is shown of a data processing system 100 which may be used for the invention. The system has a central processing unit (CPU) 110, such as a POWERPC microprocessor ("PowerPC" is a trademark of IBM Corporation) according to "The PowerPC Architecture: A Specification for a New Family of Risk (RISC) Processors", 2d ed., 1994, Cathy May, et al., ed., which is hereby incorporated by reference. A more specific implementation of a PowerPC microprocessor is described in the "PowerPC 604 Risk Microprocessor User's Manual", 1994, IBM Corporation, which is hereby incorporated herein by reference. The CR renaming mechanism of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. I/O devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this matter, a user is capable of inputting to the system through the keyboard 124, track ball 132, or mouse 126 and receiving output from the system via speaker 128 and display 138. Additionally, an operating system such as AIX ("AIX" is a trademark of the IBM Corporation) is used to coordinate the functions of the various components shown in FIG. 1.

Note that the invention describes terms such as comparing, validating, selecting, or other terms that could be associated with a human operator. However, for at least a number of the operations described herein which form part of the present invention, no action by a human operator is desirable. The operations described are, in large part, machine operations processing electrical signals to generate other electrical signals.

Figure 2:
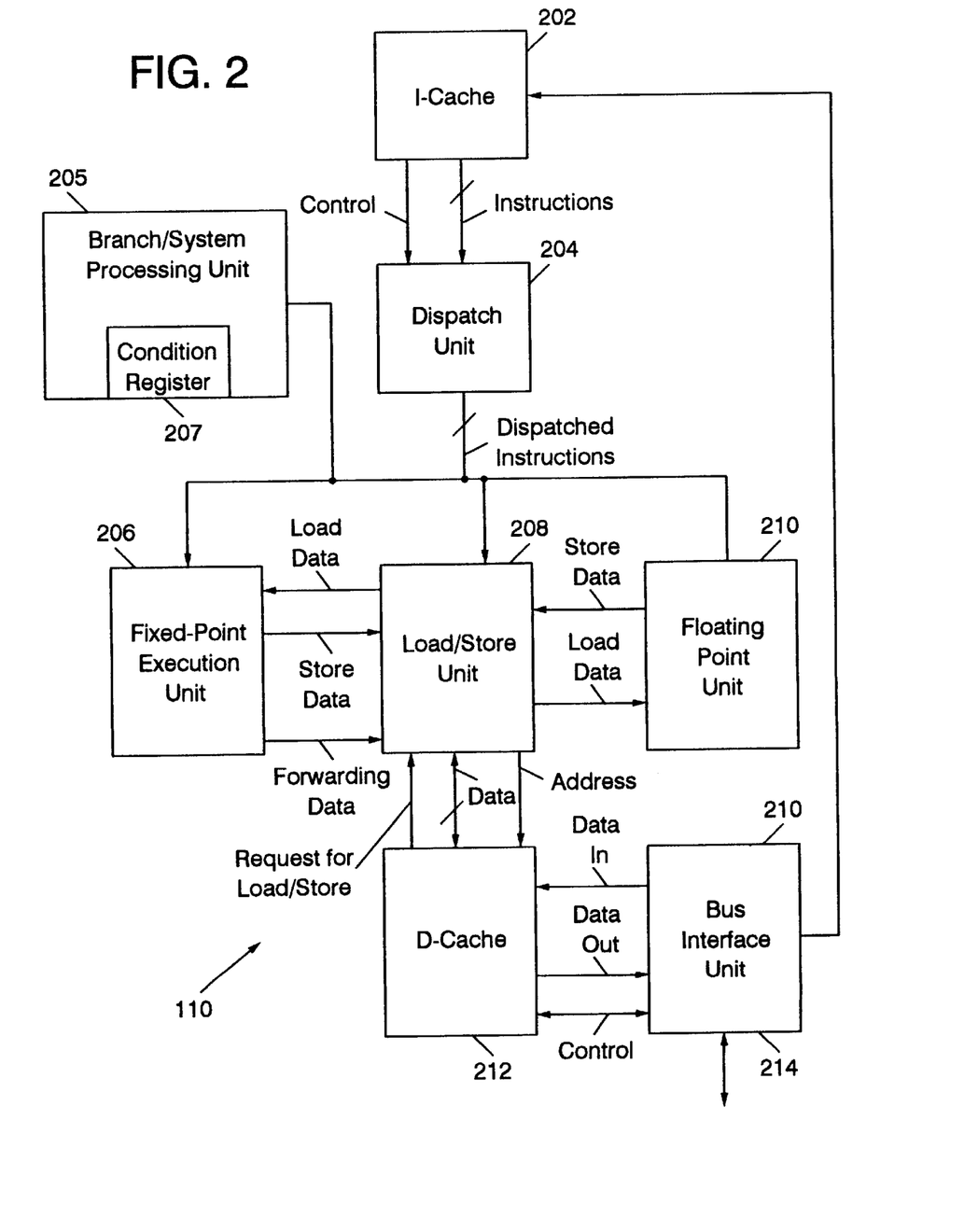
FIG. 2 illustrates, in block diagram form, a central processing unit in accordance with an embodiment of the present invention.

FIG. 2 illustrates a portion of CPU 110 in greater detail. The portion of CPU 110 comprises an instruction cache (I-cache) 202, a dispatch unit 204, a branch/system processing unit 205, a fixed point execution unit (FXU) 206, a load/store unit 208, a floating point unit (FPU) 210, a data cache (D-cache) 212, and a bus interface unit (BIU) 214. Branch/system processing unit 205 also includes condition register (CR) 207. I-cache 202 is coupled to dispatch unit 204 to communicate control information in a plurality of instructions. Dispatch unit 204 is coupled to each of branch/system processing unit 205, FXU 206, load/store unit 208, and FPU 210 to provide a plurality of dispatched instructions. I-cache 202 is coupled to BIU 214 to communicate data and control information. FXU 206 is coupled to load/store unit 208 to communicate a load data value, a store data value, and a forwarding data value. Load/store unit 208 is coupled to FPU 210 to communicate a store data value and a load data value. Load/store unit 208 is also coupled to D-cache 212 to communicate a request for a load/store signal, a plurality of data values, and an address value. D-cache 212 is coupled to bus interface unit 214 to communicate a data in signal, a data out signal, and a control signal.

Figures 3, 3A:
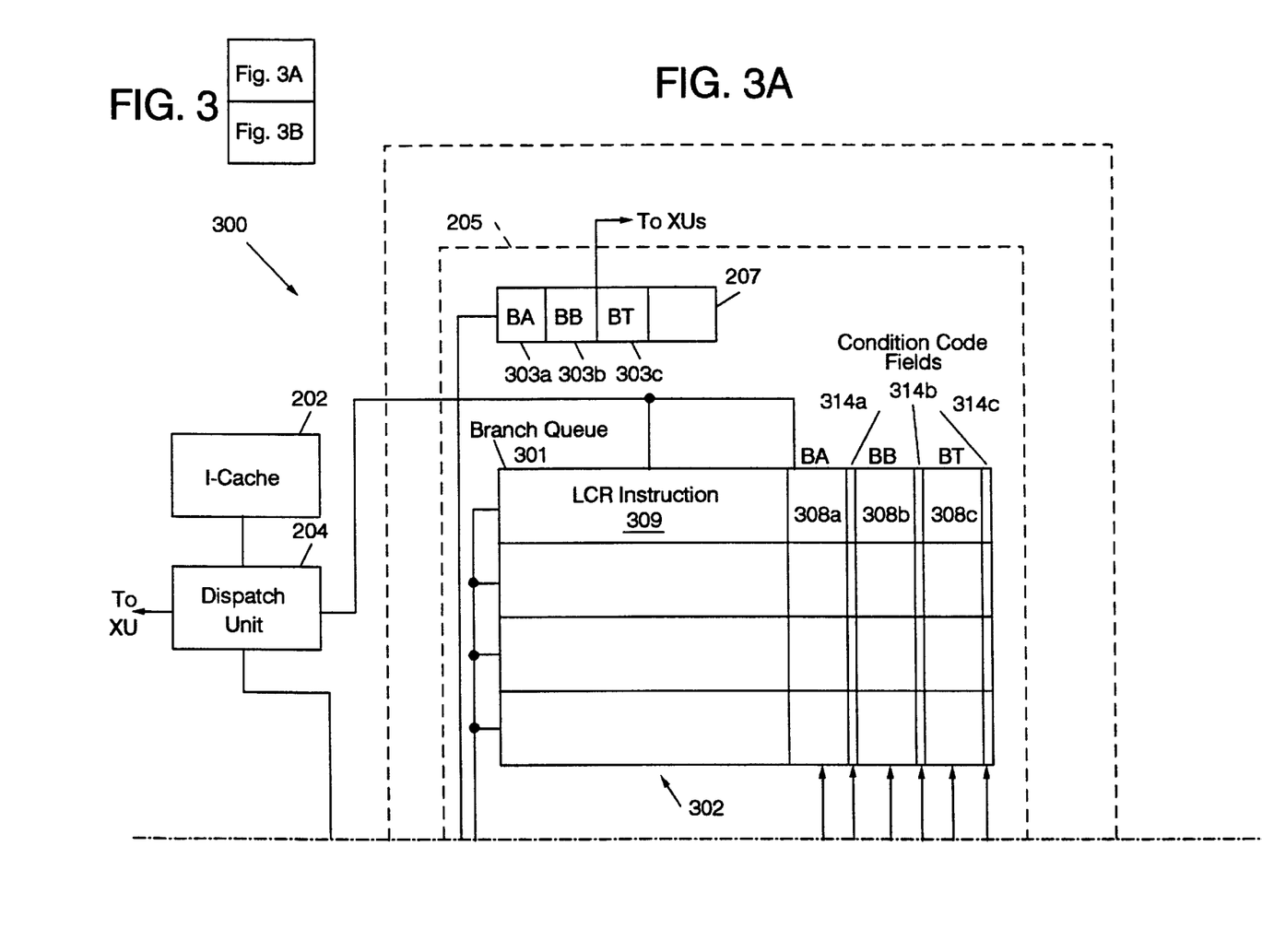
Figure 3B:
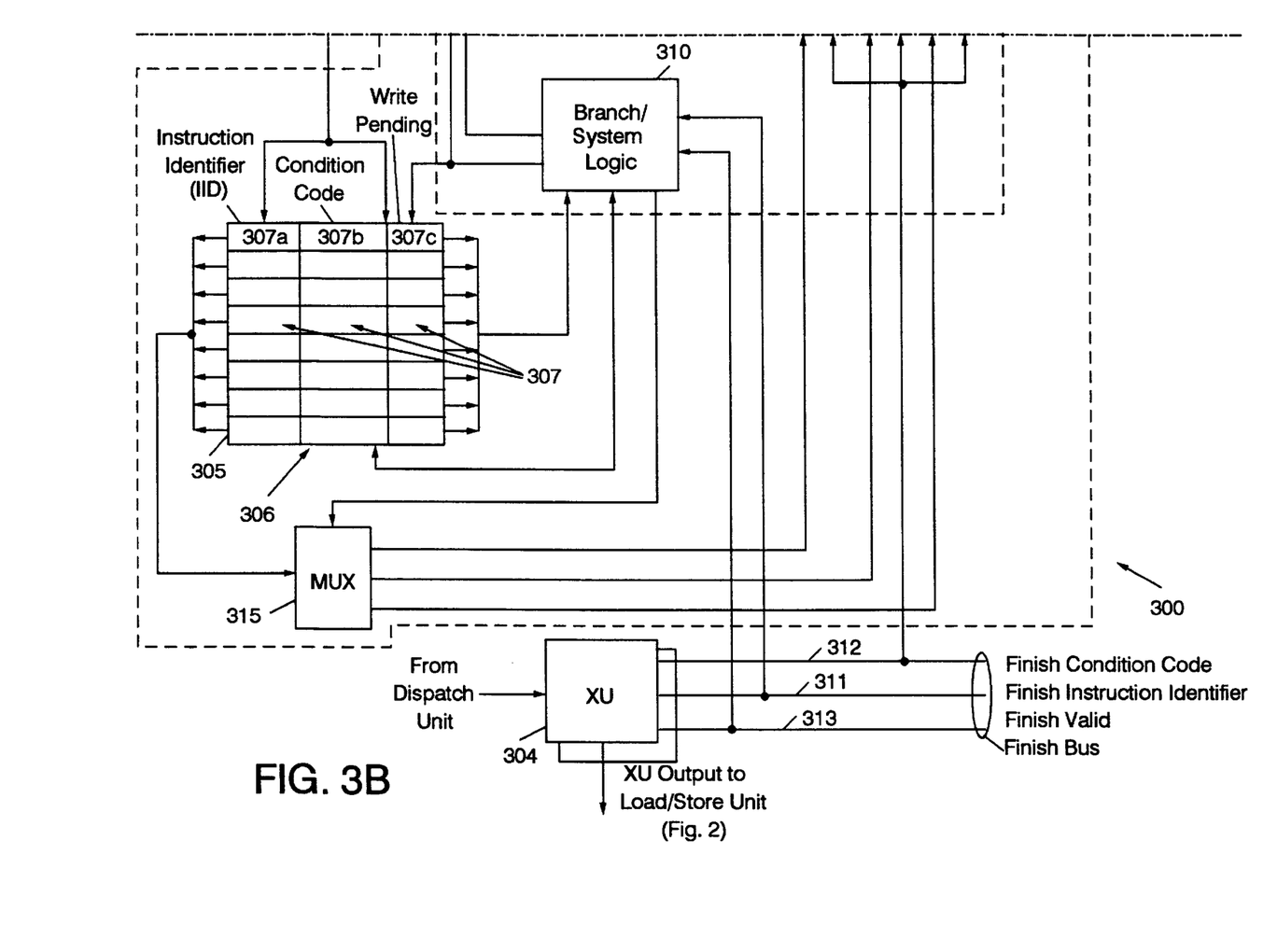

FIG. 3 illustrates a CR rename mechanism 300 according to the principles of the present invention. CR rename mechanism 300 is incorporated in branch/system processing unit 205 in CPU 110. Instructions targeted for branch/system processing unit 205 are retrieved from I-cache 202 and loaded into branch queue 301 by dispatch unit 204. Branch queue 301 contains an instruction stack portion 302 containing instruction data values. Branch queue 301 may be a first-in-first-out (FIFO) structure having a predetermined value, M, in depth. Each entry in instruction stack 302 contains a machine instruction data value, usually in binary form. Each instruction includes an instruction identifier (IID) portion that is assigned by issue unit 204 and which is used by a completion unit (not shown) to reorder out-of-order instructions. Architected registers are updated on completion of the updating instruction. Instructions targeted for branch/system processing unit 205 include branch instructions and instructions that perform logical operations on the data in condition register 207.

Instructions that perform logical operations on data values in condition register 207 will be referred to as condition register logical (LCR) instructions. In an embodiment of a data processing system incorporating the principles of the present invention, LCR instructions may take three operands, a pair of source operands, here denoted BA and BB, and a destination operand, BT, each of these symbols referring to a corresponding field, 303a–303c, in condition register 207. Condition register 207 may include a plurality of fields, P, in number. However, it would be understood by one of ordinary skill in the art that, in an alternative embodiment, LCR instructions may incorporate a predetermined plurality, M, of source operands, and a second predetermined plurality, N, of destination operands.

If dispatch unit 204 issues an instruction to execution unit 304 which modifies data in condition register 207, the corresponding IID of the instruction is sent to condition register rename buffer 305. Condition register rename buffer 305 may include a plurality of registers 306. The plurality of registers 306 may include a number of registers, P, that is equal to the number of data fields in condition register 207. In such an embodiment, each register 306 corresponds to a data field 303 in condition register 207. Each register 306 in rename buffer 305 further includes a plurality of data fields 307. The first data field, 307a, contains the IID of an instruction which modifies the data value in a field 303 of condition register 207. Each data field 303 corresponds to a register 306, and the IID of the modifying instruction is loaded into field 307a in the register 306 corresponding to the field 303 being modified. The current data value in the corresponding field 303 is loaded into field 307b of register 306. A write pending data value is also set in field 307c of the respective register 306. The write pending data value in field 307c may be one bit wide.

LCR instructions use the IIDs stored in field 307a of registers 306 to resolve their data dependencies in condition register 207. When an LCR is issued by dispatch unit 204, and loaded into branch queue 301, the IID of any instructions pending in an XU 304 that modify one or more of operand BA, BB, or BT are loaded into fields 308a–308c corresponding to each of the three operands. The LCR instruction data value itself is loaded into field 309 in the same member of instruction stack 302. LCR instructions 309 inform branch/system logic 310 of the operation to be performed, and branch/system logic 310 executes the instruction at the appropriate time.

As instructions execute, succeeding instructions move down instruction stack 302. The instruction data values in LCR instruction 309 as well as the IIDs in fields 308a–308c move together down instruction stack 302. When an LCR instruction reaches the bottom of the stack it is ready to execute. However, an instruction may not execute until all data dependencies are resolved. The LCR instructions must wait until valid data in its operand fields 303 is available.

Branch/system processing unit 205 resolves data dependencies in LCR instructions waiting to execute by snooping execution unit finish buses. A finish bus transmits data from an XU, such as XU 304. The data includes condition codes, validity bits, IIDs, and exceptions. If a write to a field 303 in condition register 207 is pending from an instruction executing in an XU 304, the LCR instruction next to execute must wait until valid data is available in the corresponding operand field 303a–303c. In other words, according to the prior art, the LCR instruction next to execute must wait until the instruction in an execution unit 304 completes and the respective operand fields 303a–303c in condition register 307 are updated thereby.

In order to alleviate this bottleneck, in a branch/system processing unit 205 according to the principles of the present invention, branch/system logic 310 snoops the finish buses of XU 304. An LCR instruction next to execute informs branch/system logic 310 of its operand dependencies through the IIDs contained in fields 308a–308c which reflect the dependencies on operands BA, BB, and BT, respectively. Recall these IIDs are the identifiers of instructions which modify the operand values. Branch/system logic 310 uses the IID to snoop for the corresponding instruction finishing execution on an XU 304. When the IID of an instruction corresponding to one or more of the IIDs in fields 308a–308c appears on finish IID line 311, branch/system logic 310 knows that the corresponding instruction is finishing and that the operand value will be available on the finish condition code line 312. The operand value on condition code line 312 is valid when XU 304 sets a validity data value on finish valid line 313. Finish condition codes are stored in fields 314a–314c of fields 308a–308c, respectively. When all of the operand data values have thus been resolved, LCR instruction 109 at the bottom of instruction stack 302 may then execute without having to wait for the instruction executing in an execution unit 304 to complete. In this way, LCR instructions are deserialized by branch/system unit processing 205 according to the principles of the present invention.

Branch/system logic 310 also controls the storing, in fields 308a–308c, of the IIDs of instructions that modify condition register 207. When an LCR instruction is dispatched by dispatch unit 204 to branch queue 301, and is loaded in LCR instruction 309 at the top of instruction stack 302, branch/system logic 310 detects the fields 303 in condition register 207 corresponding to the instruction operands. Branch/system logic 310 then sends a control signal to MUX 315. MUX 315 receives as input each of the IIDs 307a in condition register rename buffer 305 that correspond to pending instructions that modify condition register 207 fields. In response to the control signal, MUX 315 selects the IIDs of the pending instructions in each XU 304 that modify the LCR instruction operands BA, BB, and BT, fields 303a–303c, respectively. These are then loaded into the fields 308a–308c in branch queue 301, and move down the stack with LCR instruction 309 as instructions in instruction stack 302 are executed, as previously described.

If all instructions modifying operands BA, BB, and BT have completed, then the corresponding fields 303a–303c in condition register 207 have valid data. In this case, the write pending data values in fields 307c corresponding to condition register 207 fields 303a–303c are cleared when the instruction finishes. Then, branch/system logic 310 uses the operand values in fields 303a–303c in condition register 207 in executing the LCR instruction.

Figure 4:
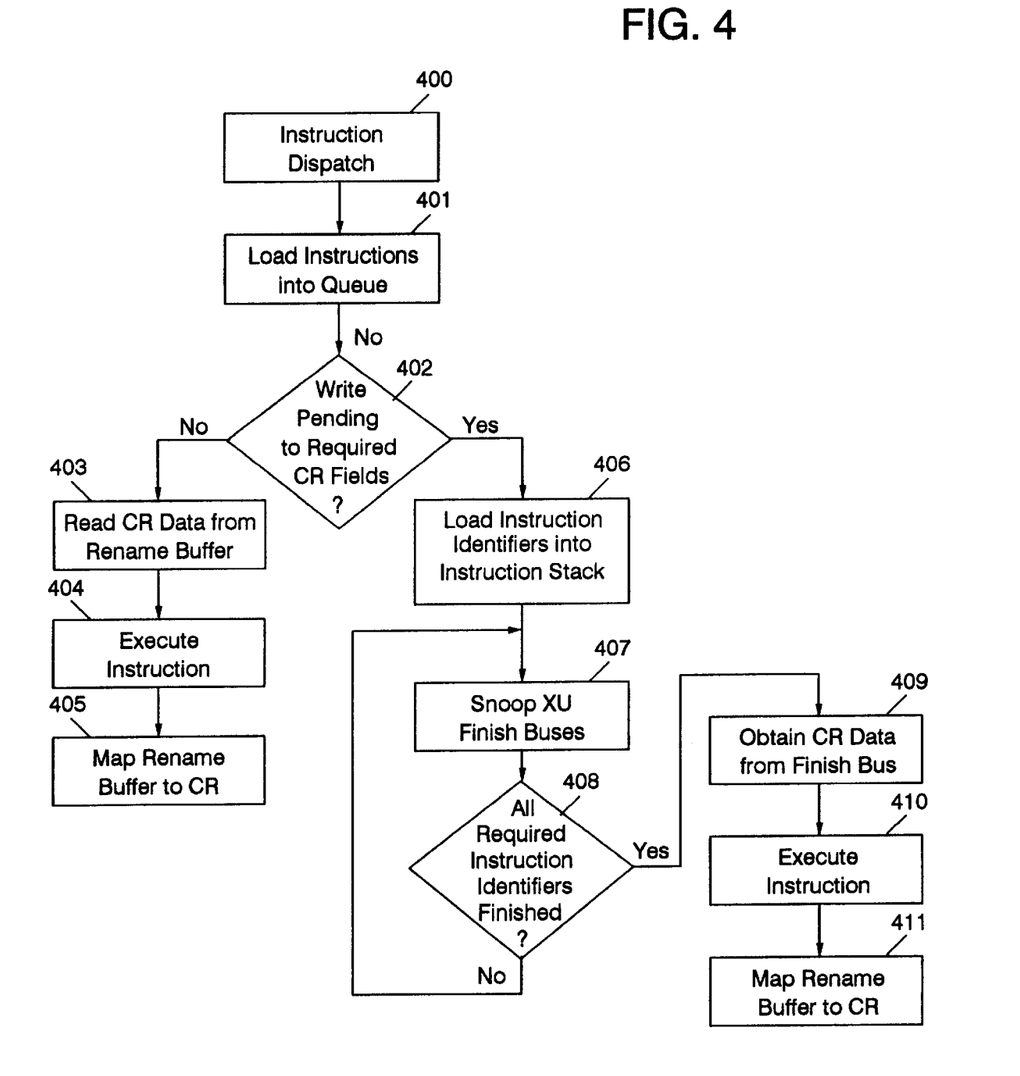
FIG. 4 illustrates, in flow chart form, a method of CR update execution in accordance with an embodiment of the present invention.

Refer now to FIG. 4 in which is illustrated a flow chart of a method of out-of-order logical condition register instruction processing, according to the principles of the present invention. In step 400 an LCR instruction is dispatched by dispatch unit 204, and in step 401, the instruction is loaded into branch queue 301.

If no write pending data values have been set in field 307c, in step 402, then the condition register values in fields 307b, for each of the condition register fields 303, are valid, and in step 403, the data values required by the LCR instruction next to execute are read from condition register rename buffer 305. The LCR instruction then executes, in step 404 and in step 405 the rename buffer 305 mapped to condition register 207.

If, however, in step 402, a write pending data value has been set in one or more of fields 307c, then pending instructions in an XU 304 makes a condition register data in field 307b invalid. Then, in step 406, the IIDs in fields 307a corresponding to the fields 307c having write pending data values set are loaded into fields 308. The IIDs are loaded into fields 308a–308c corresponding to the operand fields 303a–303c in condition register 307 that will be modified by the pending instruction. Branch/system logic 310 and MUX 313 effect the writing of the IIDs into fields 308 as described hereinabove.

In step 407, the finish buses of the XU 304 are snooped for the IIDs of finishing instructions corresponding to the IIDs loaded into branch queue 301 in step 408. Snooping continues, in step 408, until all the required instructions corresponding to the IIDs stored in fields 308 have finished. Then, in step 409, the condition register condition codes for the corresponding LCR instruction operands are obtained from the finish bus. The LCR instruction next to execute then has its requisite operand values and executes in step 410. In step 411 the condition register 207 is mapped to rename buffer 305, whereby fields 307b in condition register rename buffer 305 contain the condition register data values updated by the operation of the LCR instructions.

Although the present invention and its advantages have been described in detail, it should be understood that various changes, substitutions and alterations can be made herein without departing from the spirit and scope of the invention as defined by the appended claims.

What is claimed is:

1. A data processing system for out-of-order logical condition register processing comprising:
    input means for communicating a plurality of instructions, said instructions implementing logical condition register operations;
    a processing unit, receiving one or more of said plurality of instructions, coupled to an output of each of one or more execution units for receiving instruction operand values therefrom, said processing unit including a portion for receiving a plurality of instruction identifiers (IID) wherein execution unit instructions corresponding to said plurality of instruction identifiers modify one or more architected register operands; and
    a data storage device receiving data from said architected register, said data storage device being coupled to said processing unit for providing said IIDs thereto.

2. The data processing system of claim 1 wherein said processing unit further comprises a logic unit coupled to an output of each of said one or more execution units, and wherein said portion for receiving a plurality of instruction identifiers is included in an instruction stack coupled to said logic unit.

3. The data processing system of claim 1 wherein said processing unit includes an instruction stack of predetermined depth, said portion for receiving a plurality of instruction identifiers forming a subset of a plurality of fields in each instruction stack entry.

4. The data processing system of claim 1 wherein said data storage device is coupled to said processing unit by a multiplexer.

5. The data processing system of claim 1 wherein said portion for receiving a plurality of instruction identifiers associated with a plurality of architected register operands further includes a portion for receiving a condition code data value.

6. The data processing system of claim 1 wherein said processing unit receives architected register data values from said output of each of one or more execution units in response to a validity data value from said output.

7. The data processing system of claim 1 wherein said input means is a dispatcher, wherein said processing unit is a branch/system processing unit including:
    a branch queue having a plurality of storage locations, each storage location having at least three data fields, two of said at least three data fields containing an instruction identifier (IID) and including a subfield for receiving a condition code data value;
    a logic unit coupled to said branch queue and to a finish bus of each of a plurality of execution units, said logic unit receiving an instruction identifier (IID) corresponding to an instruction updating a condition register; and
    an architected condition register coupled to said logic unit, said condition register having a plurality of data fields, and wherein said data storage device is a condition register rename buffer, said condition register rename buffer including a plurality of storage registers having at least three data fields, one of said data fields containing an IID corresponding to an instruction updating said condition register, a second of said data fields containing a write pending data value, and a third of said data fields containing a condition code data value, said plurality of storage registers including a number of storage registers at least as great as a number of data fields in said condition register, said data field containing an IID being coupled to said two data fields of said branch queue containing an IID by a multiplexer (MUX, said MUX receiving a control signal from said logic circuit.

8. In a data processor, an mechanism for deserialized logical condition register processing comprising:
    a queue having an instruction stack including one or more instruction registers, wherein each instruction register includes a first portion containing instruction data and at least two portions containing a first and second instruction identifier, said identifiers corresponding to instructions that modify condition register data values, and logic circuitry for performing logical operations on condition register data values in response to said instruction data;
    a condition register coupled to said logic circuitry; and
    a data storage device having one or more storage locations, wherein a first portion of each storage location contains an instruction identifier, and a second portion contains a condition register data value, and wherein said first and second portions are coupled to said logic circuitry.

9. The mechanism of claim 8 wherein said logic circuitry is coupled to an output bus of one or more execution units.

10. The mechanism of claim 8 wherein each storage location of said data storage device corresponds to a data field in said condition register.

11. The mechanism of claim 8 wherein each storage location of said data storage device further includes a third portion containing third data value, said third portion being coupled to said logic circuitry, and said third data value denoting a write pending state.

12. A method of out-of-order logical condition register processing comprising the steps of:

storing a first condition register instruction in a first data storage portion of a location in a first data storage device, said first data storage device having one or more data storage locations, each location including a plurality of data storage portions; and if at least one second condition register instruction modifies at least one condition register field corresponding to an operand of said first condition register instruction, storing an instruction identifier associated with said second condition register instruction in at least one second data storage portion of said plurality of data storage portions in said location corresponding to said first condition register instruction.

13. The method of claim 12 further comprising the steps of:

snooping an output bus associated with each of one or more execution units; and if an instruction identifier corresponding to one or more of said stored instruction identifiers is outputted on said bus, obtaining a condition register data value corresponding to each of said outputted identifiers.

14. The method of claim 13 wherein the step of obtaining at least one condition register data value is in response to a data valid signal.

15. The method of claim 12 wherein said step of storing an instruction identifier is in response to a data value contained in a data storage location in a second data storage device, said second data storage device having at least one data storage location.

16. The method of claim 12 further comprising the step of obtaining at least one condition register data value corresponding to an operand of said first condition register instruction from a data storage location of a second data storage device, said second data storage device having at least one data storage location.

17. The method of claim 12 wherein said step of storing an instruction identifier further comprises the step of obtaining said instruction identifier from a data storage location of a second data storage device, said second data storage device having at least one data storage location.

18. The method of claim 15 wherein each data location includes a plurality of data storage portions, a first portion containing said instruction identifier, and wherein said step of obtaining said instruction identifier is in response to a data value contained in a second portion of said data storage location.

19. The method of claim 16 further comprising the step of obtaining one or more condition register data values in response to said data value contained in a second portion of each of said data storage locations, each condition register data value being contained in a third data storage portion of a corresponding location.

20. The method of claim 12 wherein said step of storing an instruction identifier further comprises the step of, if said at least one second condition register instruction is dispatched essentially simultaneously with said first condition register instruction, obtaining said instruction identifier from said at least one second condition register instruction at dispatch time.

21. The method of claim 12 further comprising the steps of:

snooping an output bus associated with each of one or more execution units;

if an instruction identifier corresponding to one or more of said stored instruction identifiers is outputted on said bus, obtaining a condition code corresponding to each of said outputted identifiers in response to a data valid signal; and obtaining at least one condition code corresponding to an operand of said first condition register instruction from a first portion of a data register of a condition register rename buffer in response to a first write pending data value in a second portion of said condition register rename buffer, said condition register rename buffer having a plurality of data registers, each data register having at least three data storage portions, wherein said step of storing an instruction identifier further comprises the steps of:

if said at least one second condition register instruction is dispatched essentially simultaneously with said first condition register instruction, obtaining said instruction identifier from said at least one second condition register instruction at dispatch time; and if said at least one second condition register instruction is not dispatched essentially simultaneously with said first condition register instruction, obtaining said instruction identifier from third portion of said condition register rename buffer of a second data storage device in response to a second write pending data value in said second portion of said condition register rename buffer.

* * * * *